United States Patent [19]

Clausing

[11] 4,209,676
[45] Jun. 24, 1980

[54] COMPACT RACKING MECHANISM FOR CIRCUIT BREAKER

[75] Inventor: Challiss I. Clausing, Marlton, N.J.

[73] Assignee: Gould Inc., Rolling Meadows, Ill.

[21] Appl. No.: 869,588

[22] Filed: Jan. 16, 1978

[51] Int. Cl.² .............................................. H01H 9/20
[52] U.S. Cl. ................................................. 200/50 AA
[58] Field of Search .................................. 200/50 AA

[56] References Cited
U.S. PATENT DOCUMENTS 4,101,744  7/1978  Wilson ............................. 200/50 AA Primary Examiner—James R. Scott
Attorney, Agent, or Firm—Ostrolenk, Faber, Gerb & Soffen

[57] ABSTRACT

Racking mechanism for a draw-out circuit breaker movable into and out of a cubicle wherein a hook at the rear of the cubicle is engaged by a pin on the circuit breaker structure; the pin is connected by links to a travelling nut on a racking shaft extending in the circuit breaker in the direction of movement of the circuit breaker; rotation of the shaft in one direction causes the pin to enter the hook and then, through the travelling nut, draw the racking shaft and hence the circuit breaker toward the rear of the cubicle. Rotation of the racking shaft in the opposite direction causes the racking shaft and circuit breaker to move away from the rear of the cubicle. On predetermined movement toward the front of the cubicle, the pin is disengaged from the hook to permit withdrawal of the circuit breaker from the cubicle.

6 Claims, 6 Drawing Figures

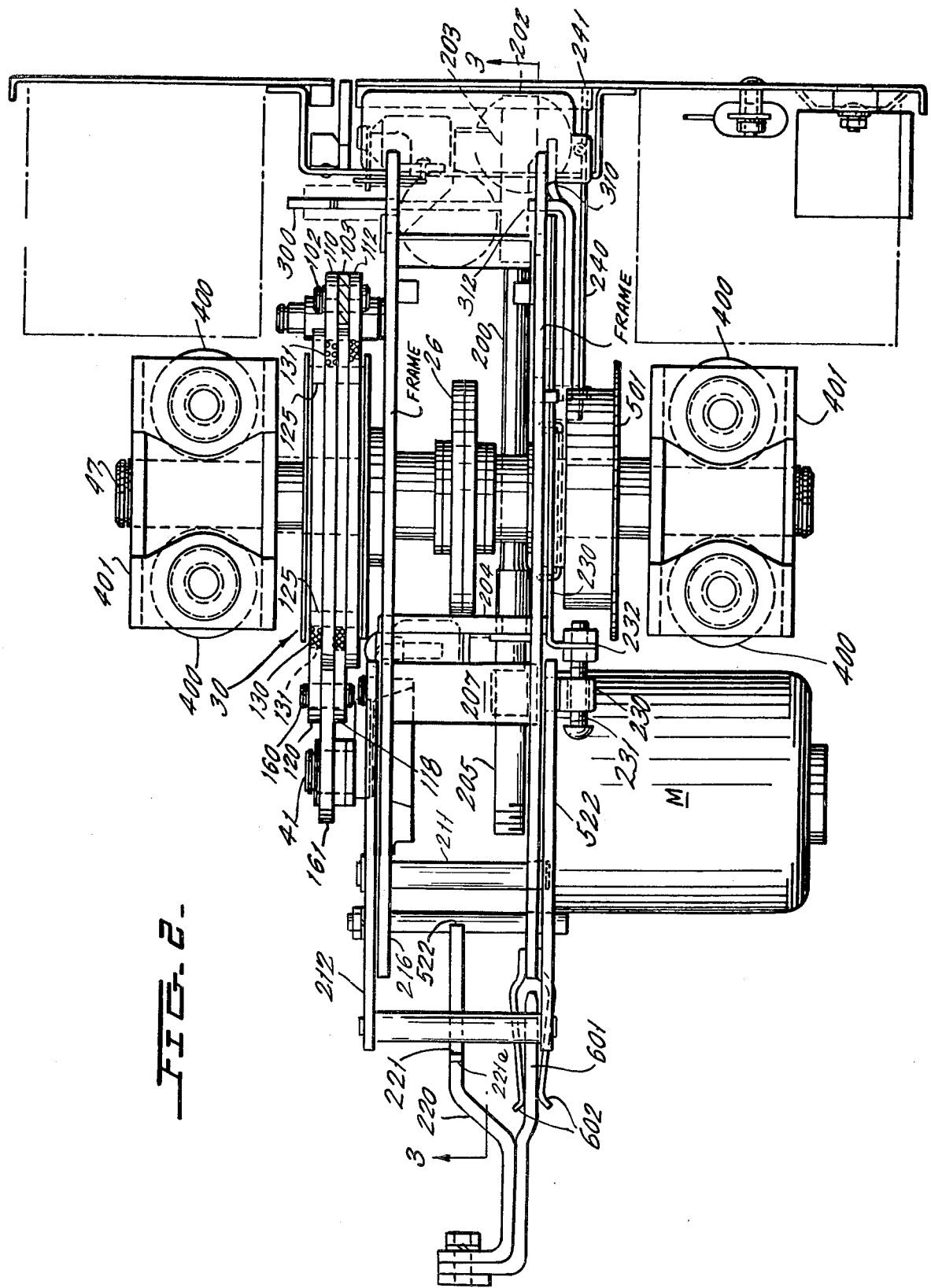

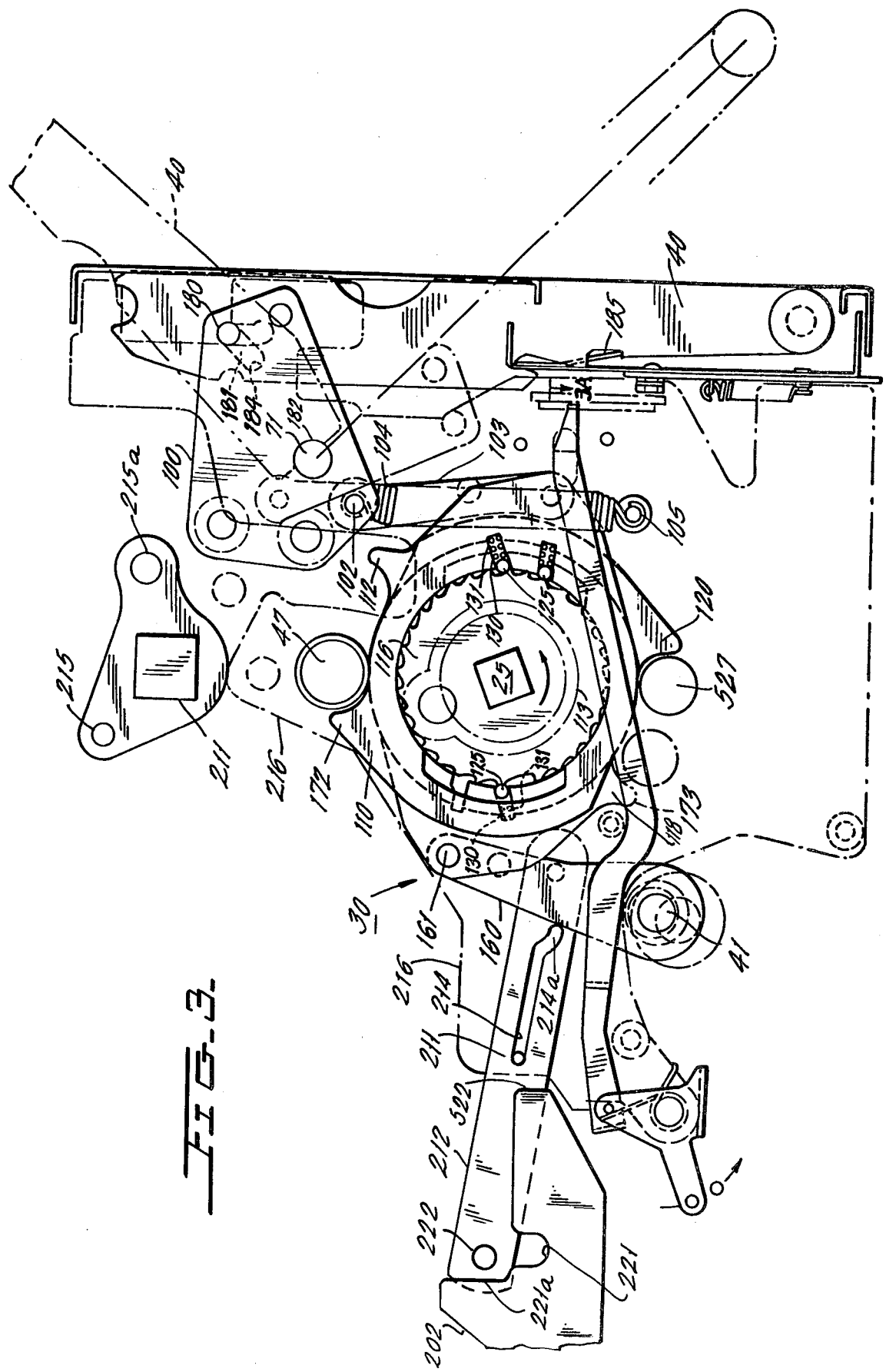

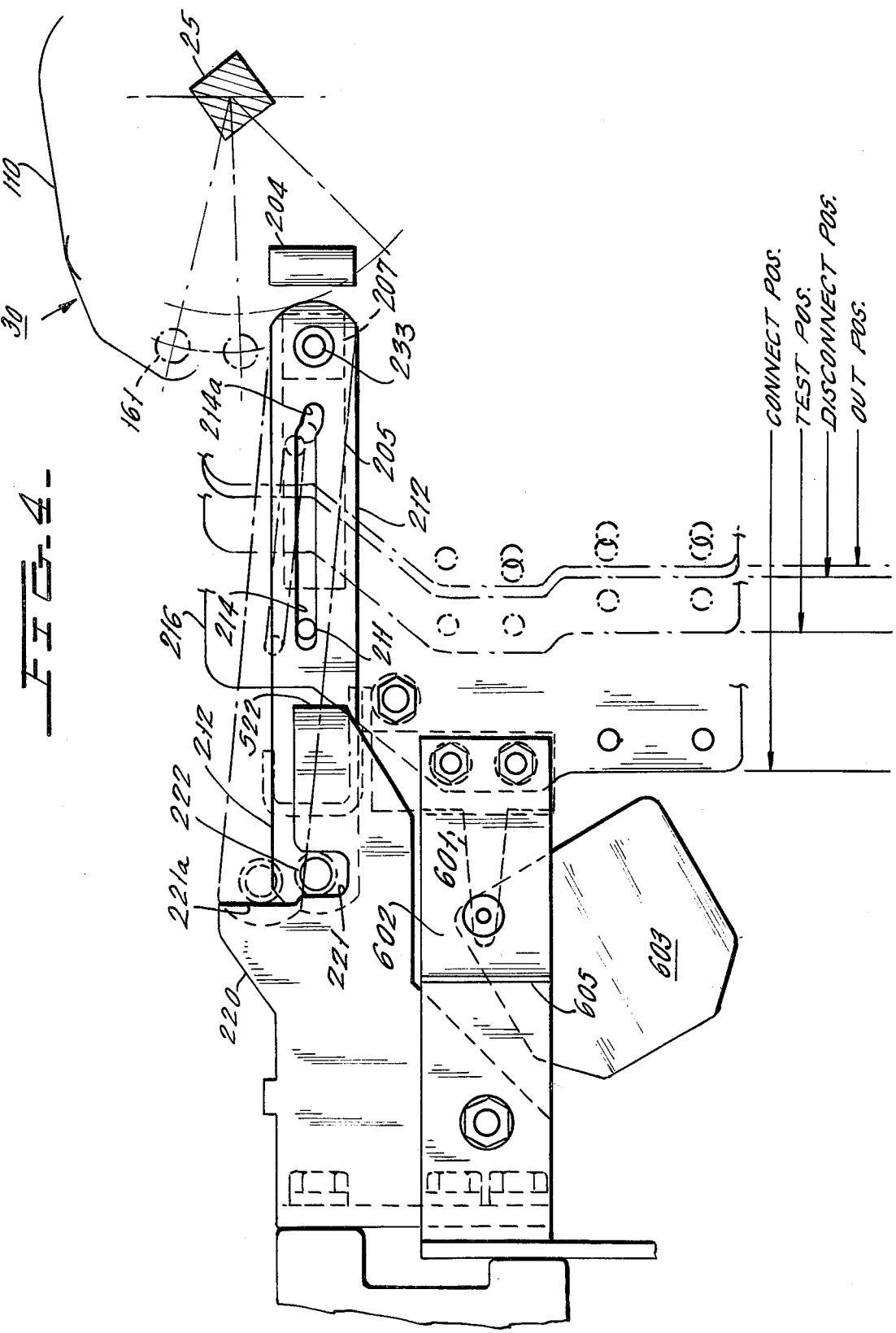

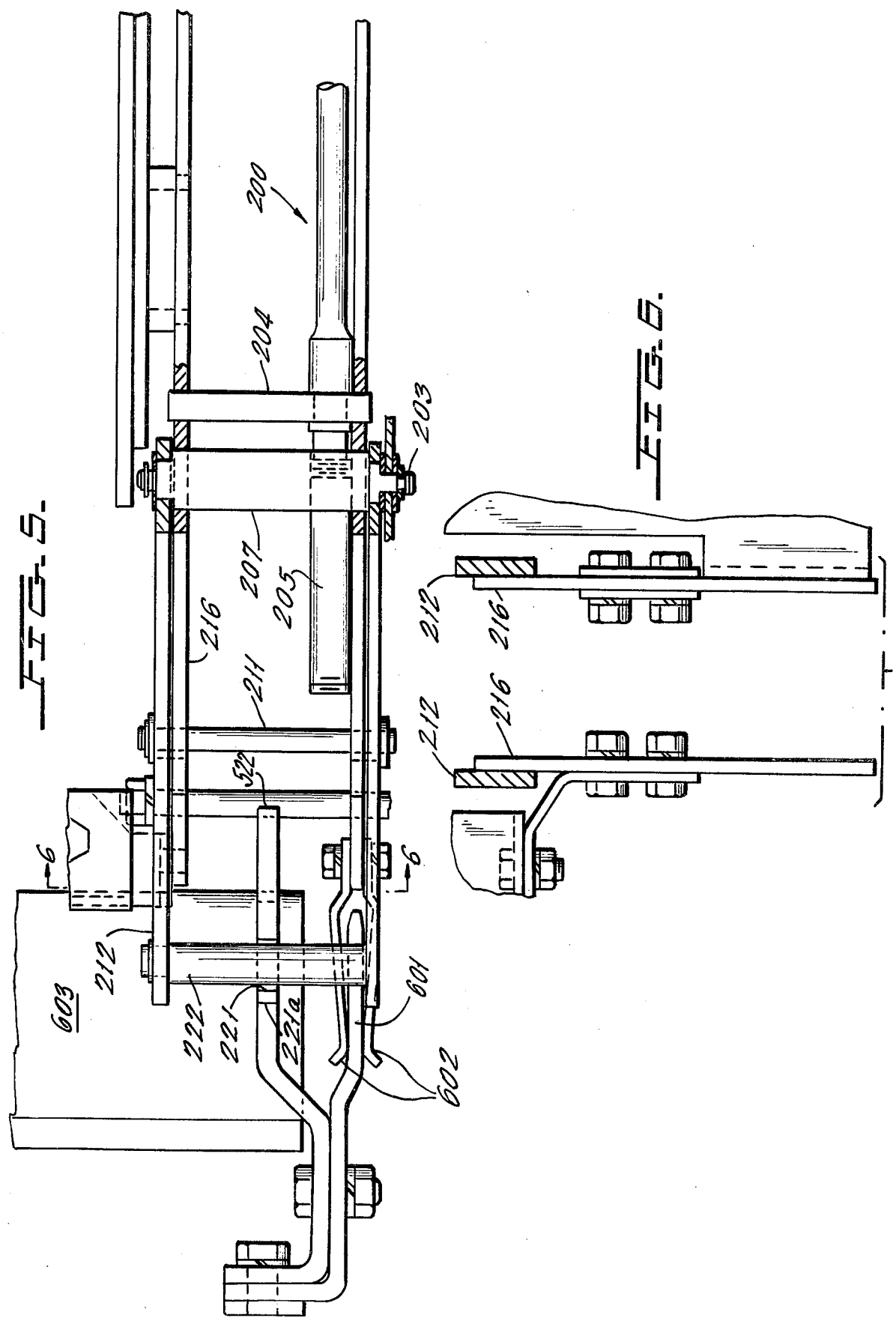

COMPACT RACKING MECHANISM FOR CIRCUIT BREAKER

BACKGROUND OF THE INVENTION

The present invention relates to circuit breakers and more particularly to draw-out circuit breakers and is an improvement of the racking mechanism for the draw-out circuit breaker as shown in U.S. Pat. No. 4,101,744 issued July 18, 1978, and assigned to the assignee of the present invention.

In the racking mechanism structure therein shown a racking shaft extending longitudinally through the circuit breaker was rotated after the circuit breaker was initially inserted into the cubicle in order to draw the circuit breaker fully into the cubicle. Also, the racking mechanism was rotated in an opposite direction in order to cause the circuit breaker to be withdrawn from the cubicle.

The racking mechanism is stationary but rotation thereof operates a travelling nut which moves along a threaded portion of the racking shaft to operate a lever which results in pulling the circuit breaker into the cubicle; and rotation of the racking shaft in an opposite direction forces the circuit breaker toward the front of the cubicle.

The present invention simplifies the operation by providing a simplified link or pair of links carrying a pin. The action of the links is controlled as a result of the rotation of the horizontal racking shaft. The pin carried by the links is adapted to engage a hook on the cradle or support for the circuit breaker within the cubicle. The hook since it is attached to the cradle is a stationary structure. When the pin carried by the links engages an appropriate portion of the hook, rotation of the racking shaft in an appropriate direction will cause the pin to drop into a notch in the hook. The links and a travelling nut, engaged at their opposite end, are now held stationary and the rotation of the racking shaft moves it with respect to the nut. Since a collar on the racking shaft bears against the circuit breaker housing, the entire circuit breaker moves into the cubicle.

In reverse operation, when the circuit breaker is to be withdrawn from the cubicle, rotation of the racking shaft in an opposite direction will cause the racking shaft to travel in a direction toward the front of the compartment thereby causing the circuit breaker to be pushed out of the cubicle; after the links have travelled a predetermined distance continued rotation of the racking shaft will cause the links to rise and the pin to disengage from the hook so that the circuit breaker may be withdrawn from the cubicle.

The circuit breaker links and pin are so arranged that if the racking shaft has been rotated to a position where the links and pin are in a down position while the circuit breaker is withdrawn from the cubicle, then the insertion of the circuit breaker into the cubicle will cause the pin to engage an obstruction actually constituting an extension of the hook. The circuit breaker cannot be moved into the cubicle until the racking shaft has been rotated into the correct position for insertion with the links and pin raised whereupon the racking shaft may be properly rotated to draw the circuit breaker into the cubicle.

The primary object of the present invention, therefore, is the provision of a simplified racking mechanism and particularly a simplified means of interconnecting the circuit breaker racking mechanism with the cradle in the cubicle so that the circuit breaker may readily be driven into the cubicle and readily moved out of the cubicle with appropriate controls and interlocks so that the circuit breaker cannot be inserted into the cubicle unless the racking mechanism is in a racked out position for the circuit breaker so that the racking mechanism may properly engage the hook on the cradle or stationary structure within the cubicle which is designed to support the circuit breaker.

BRIEF DESCRIPTION OF THE DRAWINGS

The foregoing and many other objects of the present invention will become apparent in the following description and drawings in which:

FIG. 1 corresponds substantially to FIG. 4 of U.S. Pat. No. 4,101,744 issued July 18, 1978, and demonstrates the improvement which the present invention presents over the prior structure.

FIG. 2 is a top view of the circuit breaker structure of FIG. 1 and corresponds to FIG. 16 of the prior U.S. Pat. No. 4,101,744, issued July 18, 1978.

FIG. 3 is a partly schematic side view of the structure of FIG. 2 taken from line 3—3 of FIG. 2 looking in the direction of the arrows and corresponds to FIG. 3 of the prior U.S. Pat. No. 4,101,744.

FIG. 4 is a schematic view corresponding to the left-hand side of FIG. 1 showing the connected position, test position, disconnect position, and out position for the circuit breaker having the racking elements of FIG. 1.

FIG. 5 is a schematic view corresponding substantially to the left-hand side of FIG. 2 and also corresponding to the portion of the structure shown in FIG. 4 showing the operation of the mechanism.

FIG. 6 is a cross-sectional view taken from line 6—6 of FIG. 5 looking in the direction of the arrows.

DESCRIPTION OF THE PREFERRED EMBODIMENT

Circuit Breaker Operation

Figure 1:
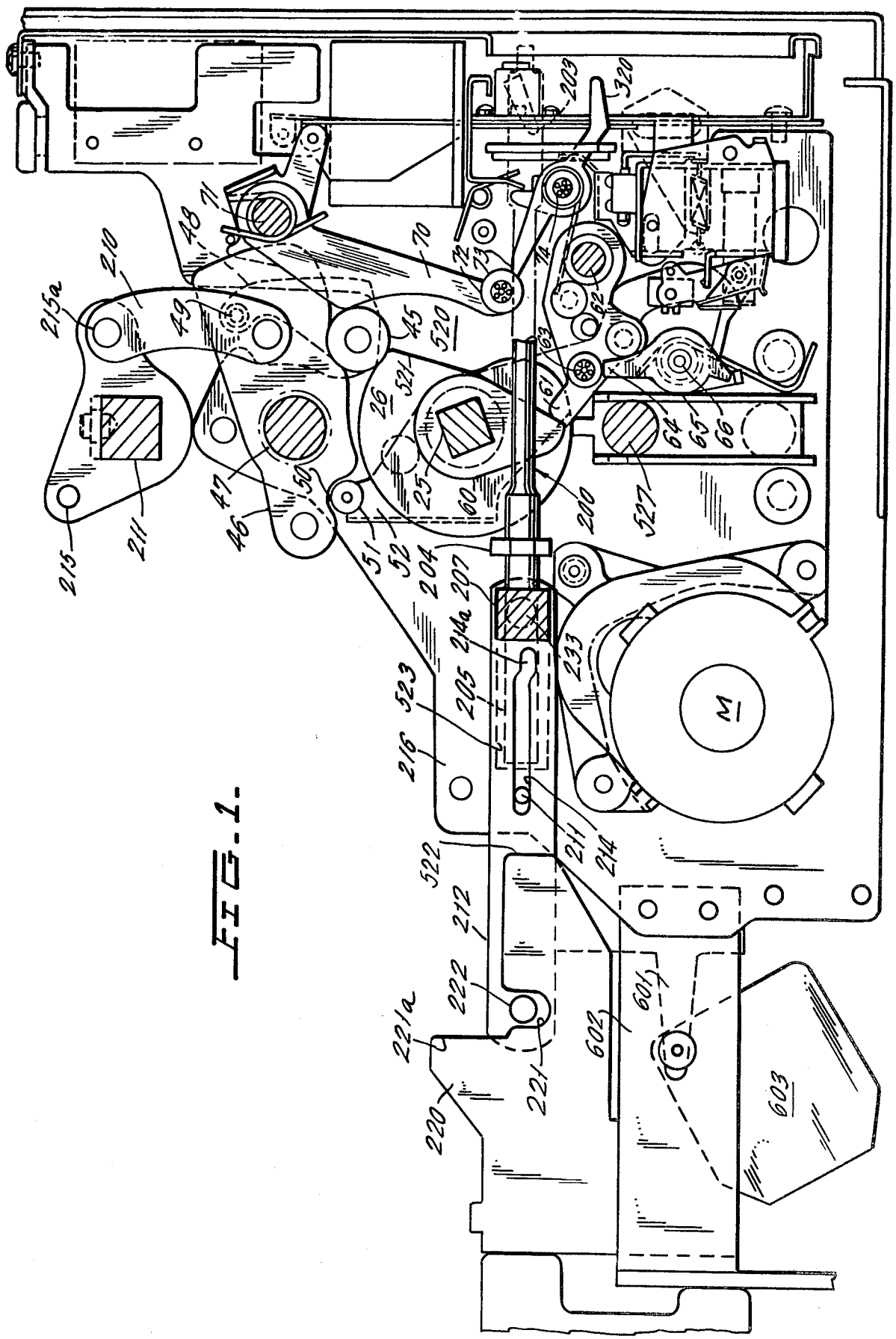
FIG. 1 is a side view partly in cross-section of a circuit breaker showing the racking shaft and racking arrangement of the present invention.

Referring first to FIGS. 1, 2 and 3, the circuit breaker operating mechanism therein shown corresponds as previously pointed out respectively to the circuit breaker operating mechanism shown in FIG. 4 of the prior application U.S. Pat. No. 4,101,744, FIG. 16 of the said application, and FIG. 3 of the said application. Consequently, the description may be abbreviated but is utilized to provide the appropriate environment for the structure of the present invention.

The circuit breaker shown is one in which springs are charged in order to provide the closing force for driving the circuit breaker contacts to closed circuit position. The charging operation may take place manually by use of a handle or by use of a motor.

The mechanism for charging the closing springs includes the principal operating shaft 25 which carries the first operating cam 26. Shaft 25 also carries crank arm 30 (FIG. 2), which crank arm has within it a plurality of ratchet mechanisms indicated schematically in FIG. 3.

The operation counterclockwise of the crank arm 30 (which includes the pawl mechanism of FIG. 3) will result in rotation of the shaft 25 and the charging of the closing springs preparatory to operation of the circuit breaker.

This operation results in moving the elements to a contact open, spring charged position. The crank arm 30 containing the pawl may be operated either by the manual handle 40 or by the motor driven crank 41 of FIG. 3, in the manner hereinafter described.

The shaft 25 is to be driven counterclockwise in the direction indicated by the arrow in FIG. 3 in order to charge the springs. For this purpose, the handle 40 is so connected as to be operated in a clockwise direction to perform the operation while the crank arm 41 can be operated in either direction to perform this operation.

The latch member 60 carried by the shaft 25 is driven onto the prop latch 61 which is pivotally mounted on the stationary pivot 62 and is provided with a latch roller 63 which is supported by the closing latch 64. The closing latch 64 is an extension of the bell crank lever 65 which is pivoted on the stationary pivot 66.

The shaft 25 may be rotated in a counterclockwise direction to charge the springs as previously pointed out by the handle 40 and by the motor crank arm 41. The handle 40 is inserted into the bell crank lever 100 and may operate it clockwise around the pivot 71 of the said bell crank lever. The pin 102 on the bell crank lever is thus raised thereby raising the link 103 connected thereto. A tension spring 104 connected between the pin 102 and a stationary pin 105 is so arranged that it provides torque to reset bell crank lever 100 each time it is rotated by handle 40.

The link 103 is arranged to operate the ratchet plates 110, 112 in a counterclockwise direction when the bell crank lever 100 is rotated clockwise. The shaft 25 carries a combination ratchet wheel crank arm 30. The ratchet wheel 30 is arranged so that it may cooperate with pawl elements carried by the member plates 110, 112, to operate the extension 118 for the manual handle and extension 120, for the motor. The pawls consist of a plurality of longitudinal rods 125 extending from pawl disc 120 through pawl disc 112. The pawls are backed up by compression springs 130 in the radial recesses 131 which thereby drive the pawls 125 into engagement with the ratchet teeth 116. The pawl carrier ratchet plates 110, 112, 118, 120, have clearances described in the above-mentioned prior application. Consequently, one set of pawls may operate the shaft 25 in response to handle operation or act as holding pawls while the other set of pawls may operate the shaft 25 in response to the operation of motor crank 41 or act as holding pawls.

The ratchet plates 110 and 112 cooperate with the stop 47 and are positioned by the motor crank 41 so that when the tail 172 on the ratchet plates 110 and 112 engages the stop 47, the rotation of the shaft 25 in a clockwise direction is halted.

It will be noted that the handle 40 is engaged with the lever 100 first by the pin 180 through the side of the handle 40 which engages in a slot 181 in each of the sides of the lever 100. When the handle is pulled out to the dotted line position of FIG. 3 and then pressed down slightly, the notched end 182 of the handle engages pin 71 of the lever 100 thereby integrating the handle 40 with the lever 100. When the position of the handle with respect to the lever 100 is shifted slightly so that the handle is pulled out to the bottom end 184 of the slot 181, then the handle may be rotated independently of the lever 100 to a position where it will hang down.

One of the results achieved by the pawl and ratchet mechanism is that the handle 100 may be used to rotate the crank arm 30 and the motor drive crank 41 may also be used each without interfering with the other.

Contact Closing Springs Operation

Upon discharge of the closing springs, the shaft 25 is rotated as described in the above mentioned prior application and the first cam 26 operates through the roller 45 to rotate the third closing cam 46 in a counterclockwise direction around its pivot 47. The roller 45, is supported on the arm 48 which is supported on the pivot 49 which is a part of cam 46. The end of the third closing cam 46 opposite to that which is engaged by the roller 45 is provided with a recess 50 which engages the roller 51 on the lever 52 which is pivoted on the shaft 25.

The second closing cam 70 is stationarily pivoted on the pivot 71 and is provided with the latch roller 72 which bears against the tripping latch 73, rotatably mounted on the pivot 74 and spring biased toward the position shown in FIG. 4. Thus, as the springs are charged, shaft 25 is rotated counterclockwise until member 60 is blocked by the prop latch 61, the prop latch 61 being in turn supported by the engagement of latch roller 63 with the closing latch 64. This occurs when the closing springs are fully charged.

The link 210 is connected to extension 215a of contact jackshaft 211. The opposite extension 215 on contact jackshaft 211 is connected to operate the moving contact arm or bridge (not shown). A cam slot 520 of variable curvature is, in effect, formed between link 70 and the side 521 of cam 26. As the spring is charged, with the contacts open, the roller 45 can move to the bottom of cam slot 520. When the contacts are closed and the spring is discharged, the roller 45 is at the top of cam slot 520. When the circuit breaker is tripped, the link 70 moves off its support latch 73 and the cam slot 520 is widened so that roller 45 is free of any support or guidance regardless of whether or not the closing springs are changed or discharged.

Racking Mechanism

The basic operation of the racking mechanism may be seen in FIGS. 1, 2, 3, 4, 5 and 6. The racking mechanism is for virtually all purposes self-contained within the circuit breaker structure and housing providing a means for cooperating with a hook on the stationary cradle fixed in the cubicle in order to rack the circuit breaker in and out of the cubicle. The cradle is described in application Ser. No. 869,777, filed Jan. 16, 1978, filed simultaneously with this application. This application is one of a group of applications related to various aspects of the same circuit breaker structure filed simultaneously herewith. They are presently referred to as U.S. Pat. No. 4,160,142 issued July 3, 1979 application Ser. Nos. 869,858, filed Jan. 16, 1978, 869,589, filed Jan. 16, 1978, 869,777, filed Jan. 16, 1978 and 921,827, filed July 3, 1978. This group of applications covers inventions which are improvements of applications Ser. Nos. 735,017, and 735,040, all filed Oct. 22, 1976 and U.S. Pat. No. 4,101,744 issued July 18, 1978.

The racking mechanism comprises the racking lead screw 200 which, again, may more readily be seen in FIGS. 1 and 2. The racking lead screw is provided at its front end with a recess 202 to which the end of a racking crank may be connected in order to rotate the lead screw 200. The lead screw 200 is mounted for rotation in appropriate bearings 203, 204 in the housing of the circuit breaker in order to support the same so that it may rotate without moving. The racking lead screw 200 is also provided with the threaded end 205 at the inner section of the circuit breaker, the threaded end 205 being arranged so that it will cooperate with the travelling nut 207. It will thus be seen that rotation by the handle (not shown) removably mounted on the end 202 of the racking lead screw 200 will cause the travelling nut 207 to move either toward the front of the breaker or toward the rear of the breaker in accordance with the direction of rotation of the racking lead screw 200. The travelling nut 207 is constrained from turning by its engagement in slots 523 (FIG. 1) of the mechanism housing.

The travelling nut 207 carries at the ends thereof, the links 212 which are driven by the travelling nut and thus move back and forth as the racking shaft 200 is rotated. The pin 211 mounted on the stationary portion of the circuit breaker frame rides in the cam slot 214 of the links. The pair of links 212 must travel with the travelling nut and thus are arranged so as they move back and forth with respect to the pin 211, they move through the various positions indicated in the FIG. 4.

Thus, when the circuit breaker is in the full disconnect condition, the pin 211 should be in the section 214a of the cam slot 214. This will result in raising the links 212. When the circuit breaker is in the fully connected position shown in FIG. 1 and referred to in FIG. 4, then the pin 211 should be at the left-hand end of the cam slot 214 and the pair of links 212 should be in the lowered position shown in FIG. 1 and in the lowest position shown in FIG. 4 aligned with the legend "connect position".

When the links 212 are lifted up, circuit breaker may be moved out of the cubicle. Thus, as the racking shaft 200 rotates, its threaded end causes the travelling nut 207 to move with respect to the circuit breaker. The links 212 rise when the travelling nut has moved the links so that the cam section 214a of the slot 214 of the links is aligned with the pin 211 which is a fixed part of the circuit breaker. This also causes the pin 222 to rise. When the racking shaft 200 is reversed and the travelling nut 207 is moved toward the right, then the links are pulled back with the travelling nut 207, the pin 211 moves out of the camming section 214a of the slot 214 in the links and the links are permitted to drop down.

As seen in FIGS. 1, 3, 4 and 5, the rear of the cradle carries a hook member 220 provided with a notch 221.

When the circuit breaker is rolled into its compartment, links 212 are required to be in the raised position (shown DOT-DASH in FIG. 4).

Pin 222 carried by links 212 strikes surface 221a of hook member 220. Surface 221a is a continuation of notch 221. This registers the breaker as being in the "out" position.

Rotation of racking shaft 200 in the proper direction starts to move travelling nut 207 toward the right of FIG. 4. Links 212 move with the travelling nut and the section 214a of cam slot 214 is immediately engaged by pin 211 which is fixed in the circuit breaker. This engagement cams links 212 downward so that pin 222 becomes fully engaged in slot 221. This is the "disconnect" position.

Further rotation of the racking shaft 200 does not alter the condition that pin 222, links 212 and travelling nut 207 remain fixed in space because of their relationship to slot 221 which is fixed in the cradle. Racking shaft 200 therefore advances toward the left with respect to travelling nut 207; since racking shaft 200 is engaged by the circuit breaker at bearing 204, the circuit breaker must move with the racking shaft.

This movement carries the circuit breaker to the "test" position and then to the "connect" position.

Reverse rotation of the racking shaft 200 will move the circuit breaker toward the right out of the compartment with positions encountered in reverse order. At the "disconnect" position cam slot portion 214a will engage pin 211 and raise links 212 so that at the "out" position the breaker may be rolled out of the compartment.

On insertion of the circuit breaker into the cubicle, it will be seen that if the pin 222 is in the down position such as that shown in FIG. 1, then an attempt to push the circuit breaker into the cubicle will be stopped by engagement of the pin 222 with the end 522 of the hook 220 thereby preventing the circuit breaker from being fully introduced into the cubicle. It will be necessary therefore for the racking shaft 200 to be rotated until the links 212 have been raised to a position shown for an out position of the circuit breaker before the circuit breaker may be entered into the cubicle. On the entry of the circuit breaker into the cubicle with the pin 222 in the appropriately raised position, this pin 222 will be stopped by the side 221a of the notch 221 to halt the entry of the circuit breaker so that further entry of the circuit breaker into the cubicle will be entirely under the control of the racking shaft 200.

It will thus be seen that by this means, a simplified racking arrangement is provided and a simplified interrelationship between the racking elements and the cradle are also provided.

As will be seen from FIGS. 5, 1 and 4, the circuit breaker frame may also be provided with the flexible contacts 602 which will engage an extension 601 of the cradle and provide a means for appropriately grounding the circuit breaker.

In the foregoing, the present invention has been described solely in connection with a preferred illustrative embodiment thereof. Since many variations and modifications of the present invention will now be obvious to those skilled in the art, it is preferred that the scope of this invention be defined not by the specific disclosures herein contained, but only by the appended claims.

I claim:

1. Racking apparatus for moving a circuit breaker into and out of a cubicle; said cubicle having a rear portion and an opposite front end having an opening through which the circuit breaker may be drawn;
    said racking apparatus comprising a hook at said rear portion of the cubicle extending toward said front end and a racking shaft on said circuit breaker; said racking shaft being mounted for rotation on said circuit breaker and being stationary longitudinally with respect to said circuit breaker;
    said racking shaft extending in the direction of movement of said circuit breaker into and out of said cubicle;
    said racking shaft having a threaded section and a travelling nut mounted on said threaded section;
    means connected to said travelling nut for engaging said hook of said cubicle when the racking shaft is rotated in one direction, and on further rotation of said racking shaft in said one direction, drawing said racking shaft and said circuit breaker toward the rear portion of said cubicle;
    rotation of said racking shaft in the opposite direction, when the circuit breaker is fully entered into said cubicle, rotation of said racking shaft in the opposite direction, causing the said means connected to said travelling nut to move against said hook and drive said racking shaft and said circuit breaker toward the front of said cubicle; and, on completion of predetermined movement of the circuit breaker toward the front of said cubicle, said means is disconnected from said hook to permit withdrawal of said circuit breaker from said cubicle;

said means connected to said travelling nut comprises at least one link extending in a vertical plane parallel to said racking shaft and pivotally mounted on said travelling nut for rotation in said plane; a pin carried by said link and extending transverse to said plane and in a direction to intercept the front of said hook when the circuit breaker is inserted into said cubicle;

said hook having a recess engageable by said pin;

said travelling nut moving said link as the racking shaft is rotated in said one direction to move said pin out of the position to intercept the front of said hook and then into said recess of said hook, the continued rotation of said racking shaft in said one direction causing said pin in its engagement with said recess in said hook to pull said racking shaft and circuit breaker toward the rear end of said cubicle.

2. The racking apparatus of claim 1 wherein rotation of said racking shaft in the opposite direction first moves the pin against said recess in said hook to drive said racking shaft and circuit breaker toward the front of the cubicle; and after a predetermined movement of the circuit breaker toward the front of the circuit breaker moves said pin out of said recess to permit withdrawal of the circuit breaker from the cubicle.

3. The racking apparatus of claim 2 wherein said means for moving said link to engage and disengage said hook comprises a pair of cooperating cam elements, one of said cam elements being located on said link and the other of said cam elements being stationarily mounted on said circuit breaker.

4. The racking apparatus of claim 3 wherein said cam element on said link is an elongated slot extending along said link and the stationarily mounted cam element is a cam pin extending into said slot;

said slot having a re-entrant curvature therein cooperating with said cam pin in one position of the travelling nut to raise said first mentioned pin clear of said front of said hook.

5. The racking apparatus of claim 4 wherein said link has an additional parallel link pivotally mounted on said travelling nut; said first mentioned pin extending between and carried at the end of said links.

6. The racking apparatus of claim 5 wherein each of said pair of links has corresponding and parallel cam slots and wherein a single cam pin stationary mounted on said circuit breaker extends into said cam slots.

* * * * *